(12) United States Patent
Bersenev

(10) Patent No.: US 7,952,320 B2
(45) Date of Patent: *May 31, 2011

(54) PORTABLE ELECTRONIC DEVICE AND CAPACITIVE CHARGER PROVIDING DATA TRANSFER AND ASSOCIATED METHODS

(75) Inventor: Alexander Bersenev, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/901,627

(22) Filed: Oct. 11, 2010

(65) Prior Publication Data

US 2011/0025261 A1  Feb. 3, 2011

Related U.S. Application Data

(63) Continuation of application No. 12/362,132, filed on Jan. 29, 2009, now Pat. No. 7,812,573, which is a continuation of application No. 11/293,902, filed on Dec. 5, 2005, now Pat. No. 7,511,452.

(51) Int. Cl.
*H02J 7/00* (2006.01)
*H01M 2/10* (2006.01)
*H04B 1/034* (2006.01)

(52) U.S. Cl. ............ 320/106; 320/134; 320/166; 429/9; 429/99; 455/95

(58) Field of Classification Search ............... 320/106
See application file for complete search history.

(56) References Cited

U.S. PATENT DOCUMENTS

| 5,276,311 | A | 1/1994 | Hennige | 235/380 |
| 5,519,262 | A | 5/1996 | Wood | 307/104 |
| 5,525,843 | A | 6/1996 | Howing | 307/9.1 |

(Continued)

FOREIGN PATENT DOCUMENTS

DE  19519881  7/1996

(Continued)

OTHER PUBLICATIONS

"Wireless Combo Set has Built-in Battery Charger", Shenzhen Harma Technology Co. Ltd., Sep. 28, 2004, Global Sources, China Sourcing Fair, available at www.globalsources.com/gsol/I/Computer-RF/a/9000000056533.htm.

*Primary Examiner* — Edward Tso
*Assistant Examiner* — Yalkew Fantu
(74) *Attorney, Agent, or Firm* — Allen, Dyer, Doppelt, Milbrath & Gilchrist, P.A.

(57) ABSTRACT

The electronic apparatus includes a portable electronic device and a charger for capacitively charging the portable electronic device when the portable electronic device is temporarily placed adjacent the charger. The portable electronic device includes a device data communication unit and an associated battery, and a pair of device capacitive electrodes, defining a device conductive footprint, to receive a charging signal to charge the battery. The charger includes a base having an area larger than the device conductive footprint and able to receive the portable electronic device thereon in a plurality of different positions, and an array of charger capacitive electrodes carried by the base. A charger controller selectively drives only the charger capacitive electrodes within the device conductive footprint with a charging signal to capacitively charge the battery. A charger data communication unit communicates with the device data communication unit via the charger capacitive electrodes and device capacitive electrodes, e.g. by modulating data onto the charging signal.

21 Claims, 5 Drawing Sheets

U.S. PATENT DOCUMENTS

| | | | |
|---|---|---|---|
| 5,682,032 A | 10/1997 | Philipp | 235/422 |
| 5,847,447 A | 12/1998 | Rozin et al. | 257/678 |
| 5,923,544 A | 7/1999 | Urano | 363/22 |
| 6,067,368 A | 5/2000 | Setlak et al. | 382/124 |
| 6,173,899 B1 | 1/2001 | Rozin | 235/492 |
| 6,184,652 B1 | 2/2001 | Yang | 320/110 |
| 6,275,681 B1 | 8/2001 | Vega et al. | 455/41 |
| 6,282,407 B1 | 8/2001 | Vega et al. | 455/41 |
| 6,331,744 B1 | 12/2001 | Chen et al. | 310/171 |
| 6,362,610 B1 | 3/2002 | Yang | 323/281 |
| 6,380,711 B2 | 4/2002 | Fischer et al. | 320/106 |
| 6,614,206 B1 | 9/2003 | Wong et al. | 320/136 |
| 6,756,765 B2 | 6/2004 | Bruning | 320/108 |
| 6,798,173 B2 | 9/2004 | Hsu | 320/134 |
| 6,803,744 B1 | 10/2004 | Sabo | 320/108 |
| 6,813,316 B2 | 11/2004 | Lohr | 375/258 |
| 6,889,565 B2 * | 5/2005 | DeConde et al. | 73/862.042 |
| 7,271,568 B2 * | 9/2007 | Purdy et al. | 320/106 |
| 2003/0001459 A1 * | 1/2003 | Scott | 310/339 |
| 2004/0212344 A1 | 10/2004 | Tamura et al. | 320/114 |
| 2005/0174094 A1 * | 8/2005 | Purdy et al. | 320/134 |

FOREIGN PATENT DOCUMENTS

| | | |
|---|---|---|
| DE | 10026174 | 10/2001 |
| GB | 2198601 | 6/1998 |
| WO | WO0192900 | 12/2001 |

* cited by examiner

PORTABLE ELECTRONIC DEVICE AND CAPACITIVE CHARGER PROVIDING DATA TRANSFER AND ASSOCIATED METHODS

RELATED APPLICATION

This application is a continuation of pending Ser. No. 12/362,132 filed Jan. 29, 2009 now U.S. Pat. No. 7,812,573, which in turn is a continuation of Ser. No. 11/293,902 filed Dec. 5, 2005, now U.S. Pat. No. 7,511,452, the entire disclosures of which are hereby incorporated herein by reference.

FIELD OF THE INVENTION

The invention relates to the field of portable electronic devices, and, more particularly, to portable electronic devices and battery chargers therefor and associated methods.

BACKGROUND OF THE INVENTION

Rechargeable batteries are used to power many of today's portable electronic devices. Rechargeable batteries make the portable electronic device more mobile than a device requiring a plug-in power source and this generally adds convenience for the user. However, recharging the batteries for a portable electronic device may be an inconvenience to the user.

For example, a rechargeable battery may carry a limited charge and therefore a user may have to monitor the charge level. Also, a user may have to make arrangements to provide for the charging of the batteries such as by carrying chargers and/or power cords.

Compounding these inconveniences for the user is the potential increased power consumption by modern portable electronic devices. Most portable electronic devices provide more functionality than their predecessors, which usually results in increased power consumption. This means more frequent recharging of the batteries of the portable electronic device, which may result in more recharging inconvenience for the user.

A number of attempts have been made to address recharging for portable electronic devices. For instance, U.S. Pat. No. 6,756,765 to Bruning discloses a system for the contactless recharging of a portable device. The system includes a capacitive plate in a pad onto which the portable device is placed for recharging.

Similarly, U.S. Pat. No. 6,275,681 to Vega et al. discloses a system that includes capacitively coupled capacitor plates for generating an electrostatic field for electrostatic charging of a smart card. The system also includes a charge controller in the rechargeable device for controlling the charging of the battery in the rechargeable device. The charger can also be an electrostatic reader so that it can charge a rechargeable device and communicate with the rechargeable device through the capacitive coupling.

Another patent to Vega et al. is U.S. Pat. No. 6,282,407, which discloses active and passive electrostatic transceivers that include capacitive charging plates for electrostatically charging. The system also includes an electrostatic reader that continuously generates and transmits an excitation signal to the medium surrounding the reader. In both of the Vega et al. patents, an embodiment is disclosed where a user can manually activate the electrostatic reader instead of having the reader radiating continuously.

Unfortunately for some of the above devices, a user may still need to monitor the charge level of the battery in the portable electronic device. In addition, some of the above devices may require the user to precisely align the electrodes of the charging device with the electrodes in the device being charged. Undesired electromagnetic interference (EMI) may also be generated by capacitive charging arrangements. Also, many portable electronic devices may need to be synchronized with a personal computer (PC) and existing wireless links may not be secure and consume too much power.

DETAILED DESCRIPTION OF THE PREFERRED EMBODIMENTS

Figure 1:
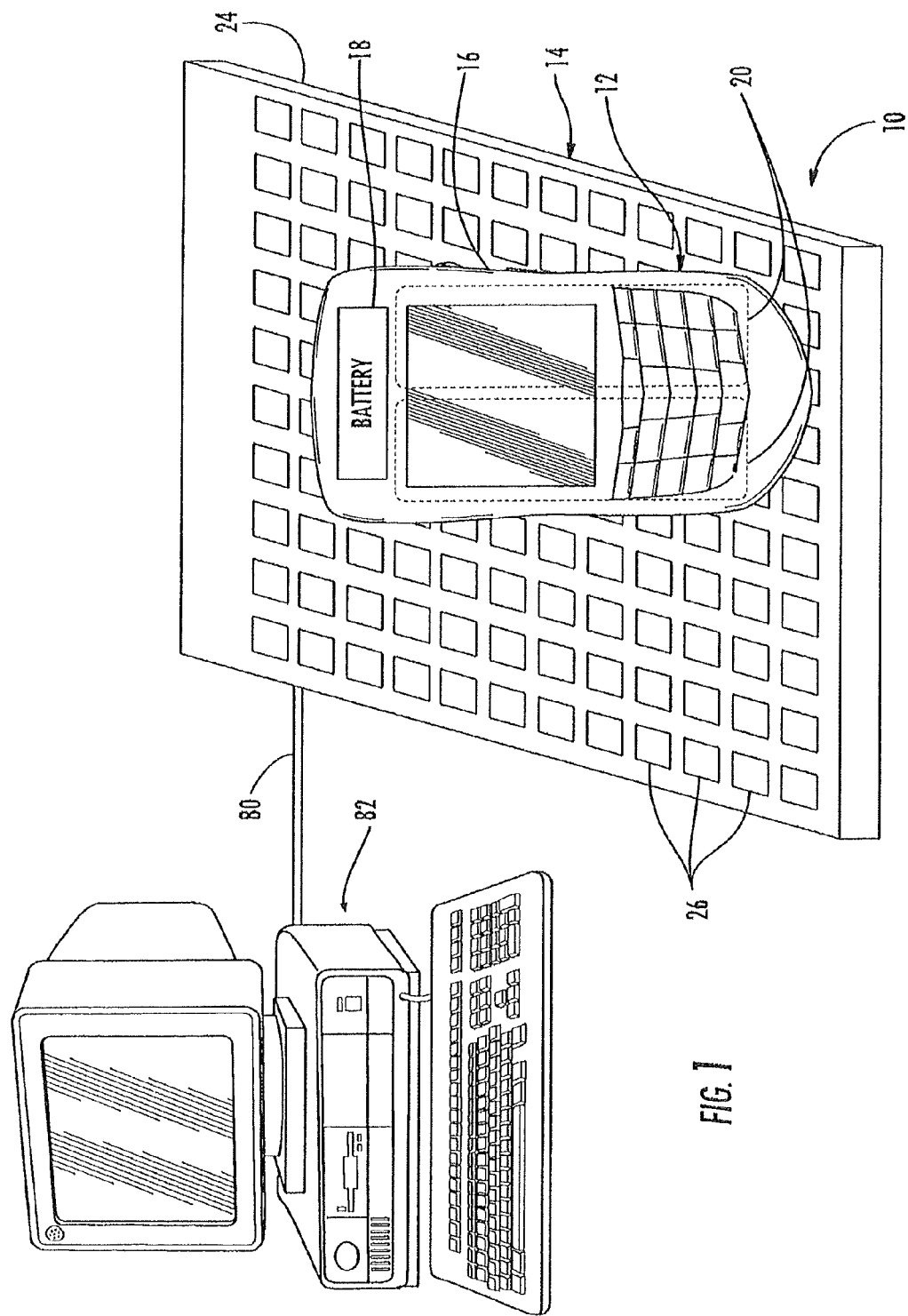
FIG. 1 is a schematic perspective view of the electronic apparatus for communicating with and charging a portable electronic device in a typical work environment.

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime and multiple prime notation are used to indicate similar elements in alternate embodiments.

Generally, an electronic apparatus and method is disclosed for conveniently charging a portable electronic device battery while also providing secure data transfer capability. The electronic apparatus includes a portable electronic device and a charger for capacitively charging the portable electronic device. The portable electronic device comprises a housing, a device data communication unit and an associated battery carried by the housing, and at least one pair of device capacitive electrodes carried by the housing to receive a charging signal to charge the battery. The pair of device capacitive electrodes define a device conductive footprint. The charger includes a base having an area larger than the device conductive footprint and able to receive the portable electronic device thereon in a plurality of different positions, and an array of charger capacitive electrodes carried by the base. A charger controller selectively drives only the charger capacitive electrodes within the device conductive footprint with a charging signal to capacitively charge the battery of the portable electronic device when the portable electronic device is positioned on the base of the charger. A charger data communication unit communicates with the device data communication unit via the charger capacitive electrodes and device capacitive electrodes.

The charger controller may sense impedances of the charger capacitive electrodes to determine whether a respective charger capacitive electrode is within the device conductive footprint or not. Also, the charger data communication unit may modulate data onto the device charging signal to communicate with the device data communication unit via the charger and device capacitive electrodes. The device may comprise a processor connected to the device data communication unit, and the device data communication unit may include a device data interface connected to the pair of device capacitive electrodes, a device data transceiver connected to the device data interface to demodulate and decode the data communicated on the charging signal, and a processor interface connected between the device data transceiver and the processor.

The charger data communication unit may include a charger data transceiver to modulate and encode the data communicated on the charging signal. As such, the charger data transceiver may modulate the data onto the charging signal using Frequency Shift Keying (FSK) modulation. Also, the charger may include a Universal Serial Bus (USB) connector to connect the charger to a personal computer (PC). The charger controller may also include a charging signal generator, a switching circuit connected between the charging signal generator and the charger capacitive electrodes, a control circuit connected to the switching circuit, a buffer connected between the charging signal generator and the switching circuit, and an impedance detector connected to the buffer and the control circuit.

A method is directed to communicating with and capacitively charging a portable electronic device with a charger. The portable electronic device includes a housing, a device data communication unit and associated battery carried by the housing, and at least one pair of device capacitive electrodes carried by the housing to receive a charging signal to charge the battery. Again, the device capacitive electrodes define a device conductive footprint. The charger includes a base having an area larger than the device conductive footprint and able to receive the portable electronic device thereon in a plurality of different positions, an array of charger capacitive electrodes carried by the base, a charger controller connected to the charger capacitive electrodes, and an associated charger data communication unit.

The method may include placing the portable electronic device adjacent the charger, and selectively driving, via the charger controller, only the charger capacitive electrodes within the device conductive footprint with a charging signal to capacitively charge the battery of the portable electronic device to thereby capacitively charge the battery of the portable electronic device. The method further includes communicating data between the charger data communication unit and the device data communication unit via the charger capacitive electrodes and device capacitive electrodes.

The method may also include sensing, via the charger controller, the impedances of the charger capacitive electrodes to determine whether a respective charger capacitive electrode is within the device conductive footprint. The charger data communication unit may comprise a charger data transceiver, and communicating may include modulating and encoding data, with the charger data transceiver, onto the charging signal. The charger data transceiver may modulate the data onto the charging signal using Frequency Shift Keying (FSK) modulation. The charger may include a Universal Serial Bus (USB) connector, and the method may include connecting the charger to a personal computer (PC) via the USB connector.

Figure 2:
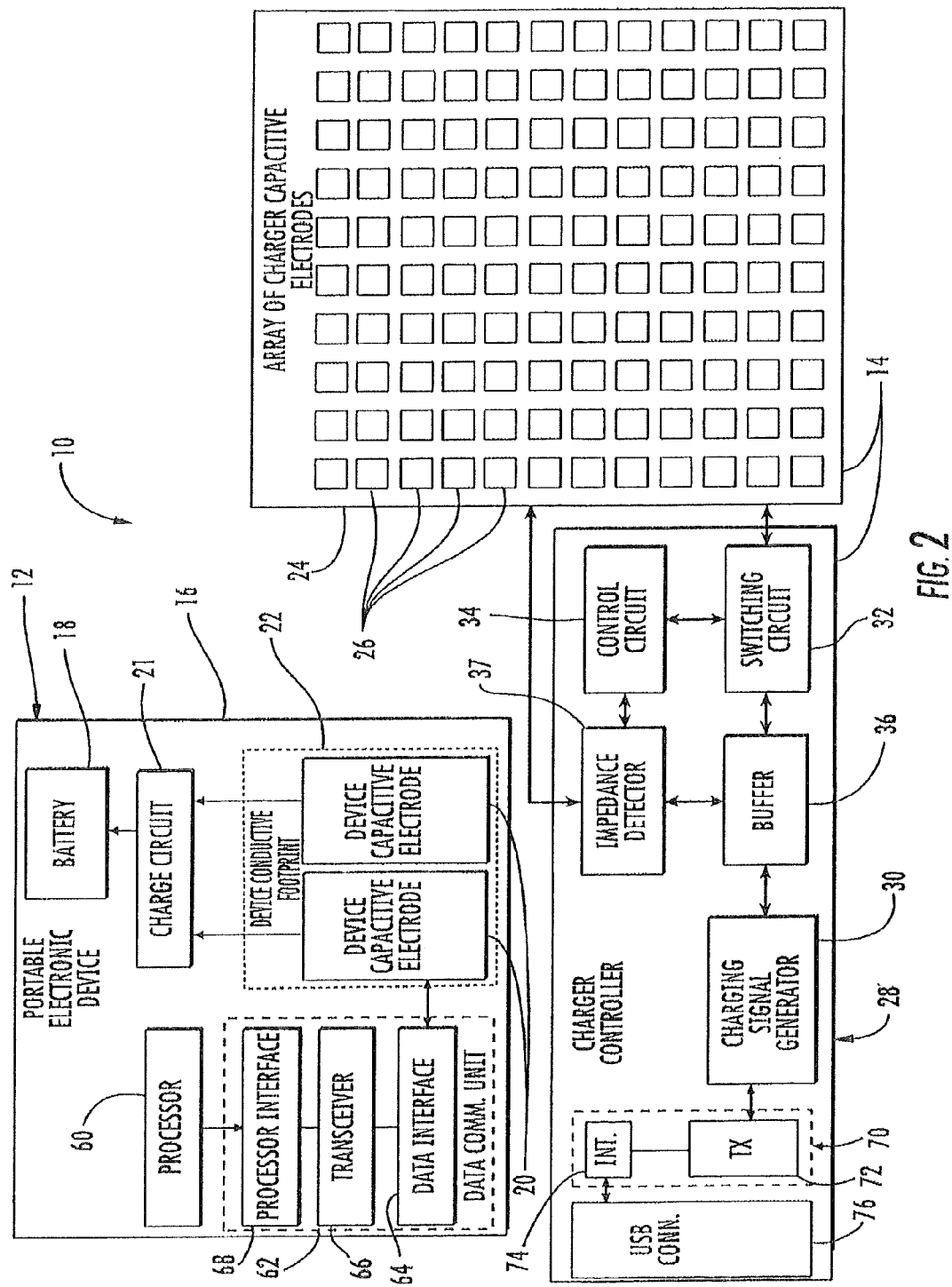
FIG. 2 is a block diagram of the electronic apparatus as shown in FIG. 1.
Figure 3:
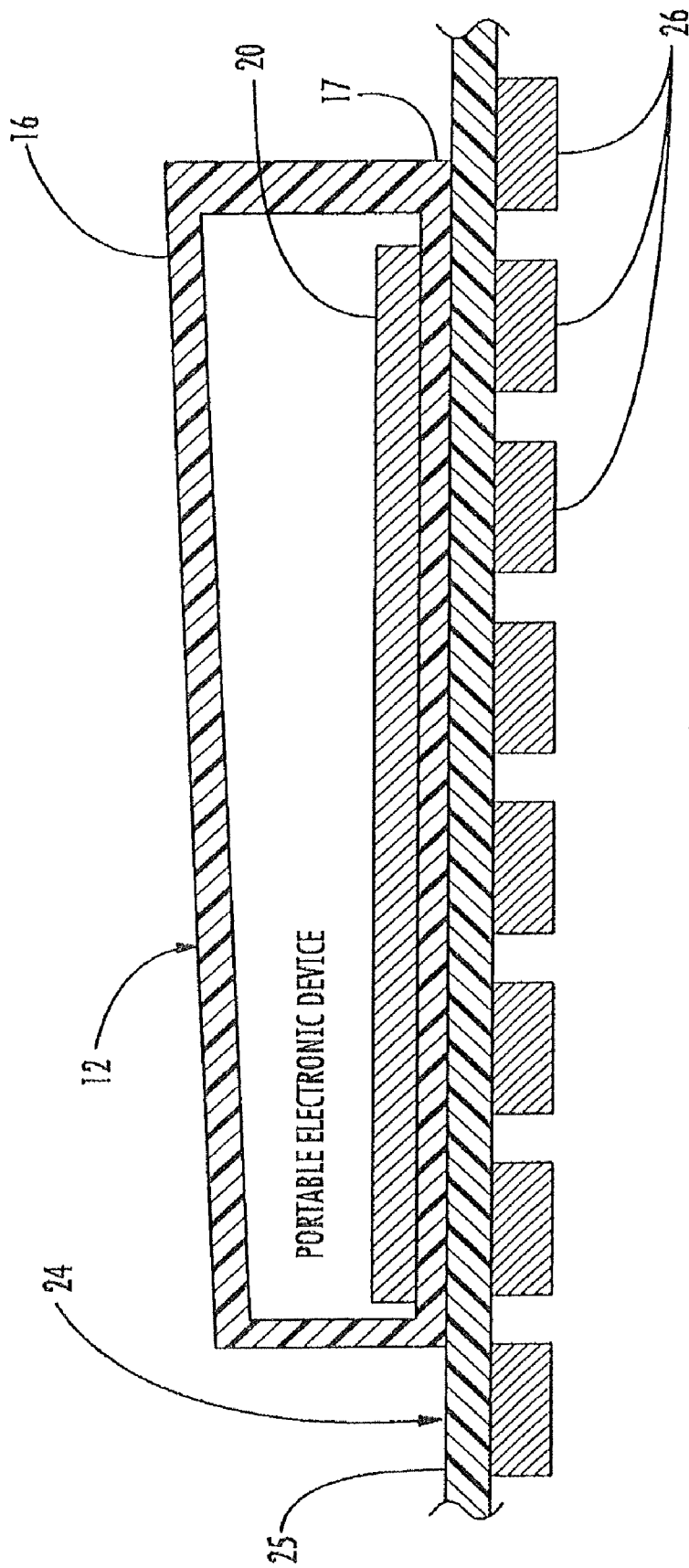
FIG. 3 is a schematic cross-sectional view of the electronic apparatus as shown in FIG. 1.

Referring initially to FIGS. 1-3, an electronic apparatus 10 including a portable electronic device 12 and a charger 14 for capacitively charging the portable electronic device is now described. The portable electronic device 10 may be in the form of a cell phone, personal digital assistant (PDA), wireless email device, pager, or the like, for example. The portable electronic device 12 illustratively includes a housing 16, a battery 18 carried by the housing, and a pair of device capacitive electrodes 20 carried by the housing for charging the battery and defining a device conductive footprint 22. A charging circuit 21 receives the differential signals from the pair of device capacitive electrodes 20. Such a charging circuit 21 may include a diode rectifier, DC-DC converter and trickle charge circuit as would be appreciated by those skilled in the art.

The portable electronic device 10 includes a processor 60 and a device data communication unit 62 which receives and processes data to be sent from or used by the processor 60 as will be discussed in further detail below. The data communication unit 62 includes a data interface 64 to send/receive signals to/from the device capacitive electrodes 20. A transceiver 66 modulates/demodulates and encodes/decodes the data to be sent via the interface 64. A processor interface 68 interfaces with the processor 60 and the transceiver 66.

The housing 16 may further include a housing dielectric layer 17 adjacent the device capacitive electrodes 20. The device capacitive electrodes 20 are arranged in closely spaced, side-by-side relation. In other embodiments, more than one pair of device electrodes 20 may be provided and/or these electrodes can be arranged in different configurations as will be appreciated by those skilled in the art.

The charger 14 illustratively includes a base 24 having an area larger than the device conductive footprint 22 and able to receive the portable electronic device 12 thereon in a plurality of different positions. The charger 14 also includes an array of charger capacitive electrodes 26 and a base dielectric layer 25 carried by the base 24. The charger 14 further includes, for example, a charger controller 28 for selectively driving the charger capacitive electrodes 26 within the device conductive footprint 22 with a charging signal sufficient to capacitively charge the battery 18 of the portable electronic device 12, and not driving charger capacitive electrodes outside the device conductive footprint with the charging signal when the portable electronic device is positioned on the charger 14 to thereby capacitively charge the battery of the portable electronic device while reducing undesired (EMI).

To help control the undesired EMI, the charger controller 28 selectively drives the charger capacitive electrodes 26 within the device conductive footprint 22 with a charging signal while not driving the charger capacitive electrodes outside the device conductive footprint. In other words, because the charger capacitive electrodes 26 being driven by the charging signal are covered by the device capacitive electrodes 20, the device capacitive electrodes function as an EMI shield as will be appreciated by those skilled in the art. As a result, for example, a wireless communication link or the USB communication link 80 between the portable electronic device 12 and the computer 82 will be less likely to be disrupted by the operation of charger 14.

The charger controller 28 may sense impedances, for example, of the charger capacitive electrodes 26 to determine whether a respective charger capacitive electrode is within the device conductive footprint 22 or not. Such sensing permits the charger controller 28 to accommodate the portable electronic device 12 if it is moved across the array of charger capacitive electrodes 26. The charger controller 28 may sequentially drive the charger capacitive electrodes 26 with a sensing signal to sense impedances thereof as will be appreciated by those skilled in the art. To further reduce EMI while providing efficient charging, the charging signal may have an amplitude at least one hundred times greater than an amplitude of the sensing signal, for example.

The charger controller 28 illustratively comprises a charging signal generator 30, a switching circuit 32 connected between the charging signal generator and the charger capacitive electrodes 26, and a control circuit 34 connected to the switching circuit. The charger controller 28 further comprises a buffer 36 connected between the charging signal generator 30 and the switching circuit 32, and an impedance detector 37 connected to the buffer and the control circuit 34. The control circuit 34 may preferably operate the charging signal generator 30 at a reduced amplitude to serve as a signal generator for the sensing signal, for example.

The device capacitive electrodes 20 are driven by an alternating current (sine wave) and receive differential excitation signals from charger base 24. In other words, when one device capacitive electrode 20 receives a positive potential from the charger capacitive electrodes 26 of the base 24 under such device electrode, the other capacitive electrode 20 receives a negative potential from the charger capacitive electrodes 26 of the base 24 under the other device electrode, and vice versa. To generate the differential excitation signals, the charger capacitive electrodes 26 of the base 24 under one capacitive electrode 20 receive an inverted excitation signal relative to charger capacitive electrodes 26 of the base 24 under the other capacitive electrode 20.

In FIG. 2, the buffer 36 produces two excitation signals, one is "normal" and other is "inverted". Then switching circuit 32 connects the normal signal to charger capacitive electrodes 26 of the base 24 under one capacitive electrode 20, and the inverted signal is connected to charger capacitive electrodes 26 of the base 24 under the other capacitive electrode 20. The impedance detector 37 first detects the device conductive footprint 22 relative to the charger capacitive electrodes 26, then this area is divided in two parts: one connected to the normal excitation signal and other connected to the inverted signal.

The charger controller 28 and the portable electronic device 12 can also communicate via the charger capacitive electrodes 26 and the device capacitive electrodes 20 such as to indicate the state of charge of the battery 18 or to provide various other synchronization operations between the device 12 and the computer 82, for example. The charger 14 is illustratively powered by the computer 82 via the Universal Serial Bus (USB) connection 80, for example. As such, the charger controller 28 may include a USB connector 76. In other embodiments, the charger 14 can be powered through a wall transformer or other devices as will be appreciated by those skilled in the art.

The control circuit 34 determines which charger capacitive electrodes 26 are within the device conductive footprint 22 by operating the charging signal generator 30 to generate a sensing signal. The impedance detector 36 senses a first impedance when a charger capacitive electrode 26 is within the device conductive footprint 22, and senses a second impedance when a charger capacitive electrode 26 is not. This sensing data is communicated to the control circuit 34.

The control circuit 34 uses this data to selectively drive the charger capacitive electrodes 26 within the device conductive footprint 22 with the charging signal, which may be about 1 MHz, for example. The charging signal generator 30 generates the charging signal, which is relayed to the buffer 36. The buffer 36 may be a differential buffer, for example, that generates the charging signal to have two components that are substantially 180 degrees out of phase with each other. The switching circuit 32 receives the charging signal and selects which device capacitive electrodes 20 receive the charging signal. The device capacitive electrodes 20 capacitively receive the charging signals to a charging circuit within the housing 16, as will be appreciated by those skilled in the art, and the charging circuit charges the battery 18.

To communicate via the charger capacitive electrodes 26, the charger controller 28 includes a charger data communication unit 70 which includes a transceiver 72 to transmit/receive data to/from the device 12 via the charger capacitive electrodes 26 and device capacitive electrodes 20. The transceiver 72 preferably modulates and encodes data onto the charging signal provided by the charging signal generator 30 to the switching circuit 32 and charger capacitive electrodes 26. The device transceiver 66 demodulates and decodes signals at the charging signal carrier frequency to detect information being transmitted by the charger transceiver 72. An interface 74, e.g. a USB interface, is provided between the charger data communication unit 70 and the USB connector 76.

In the preferred embodiment, charger transceiver 72 modulates the data onto the carrier or charging signal using Frequency Shift Keying (FSK) modulation, and encodes data using NRZ encoding for communication from the charger transceiver to the device transceiver 66. It is to be appreciated that other modulation schemes such as Amplitude Modulation (AM), Binary Phase Shift Keying (BPSK), a form of Phase Shift Keying (PSK), and others can also be used to modulate the data onto the charging signal. Other data encoding techniques may also be used as would be appreciated by those skilled in the art.

That device data communication unit 62 and the charger data communication unit 70 provide an alternative way to "Blue Tooth" or wirelessly connect to synchronize a handheld device 12 with a PC 82. This will provide better security, lower cost and lower power consumption compared to a wireless link. Charger 14 recognizes that the handheld device 12 has been placed on it's surface and establishes PC-USB-handheld link through capacitive coupling by using phase or frequency modulation (for example FSK). Eliminating the need for a Radio Frequency (RF) link to the PC 82 provides a more secure connection. There is a very low RF emission from capacitive electrodes 20/26 that is difficult to pick-up and decode. Also, the handheld device 12 receives power from charger 14 during data link, so the battery 18 is not draining but charging at this time.

Figure 4:
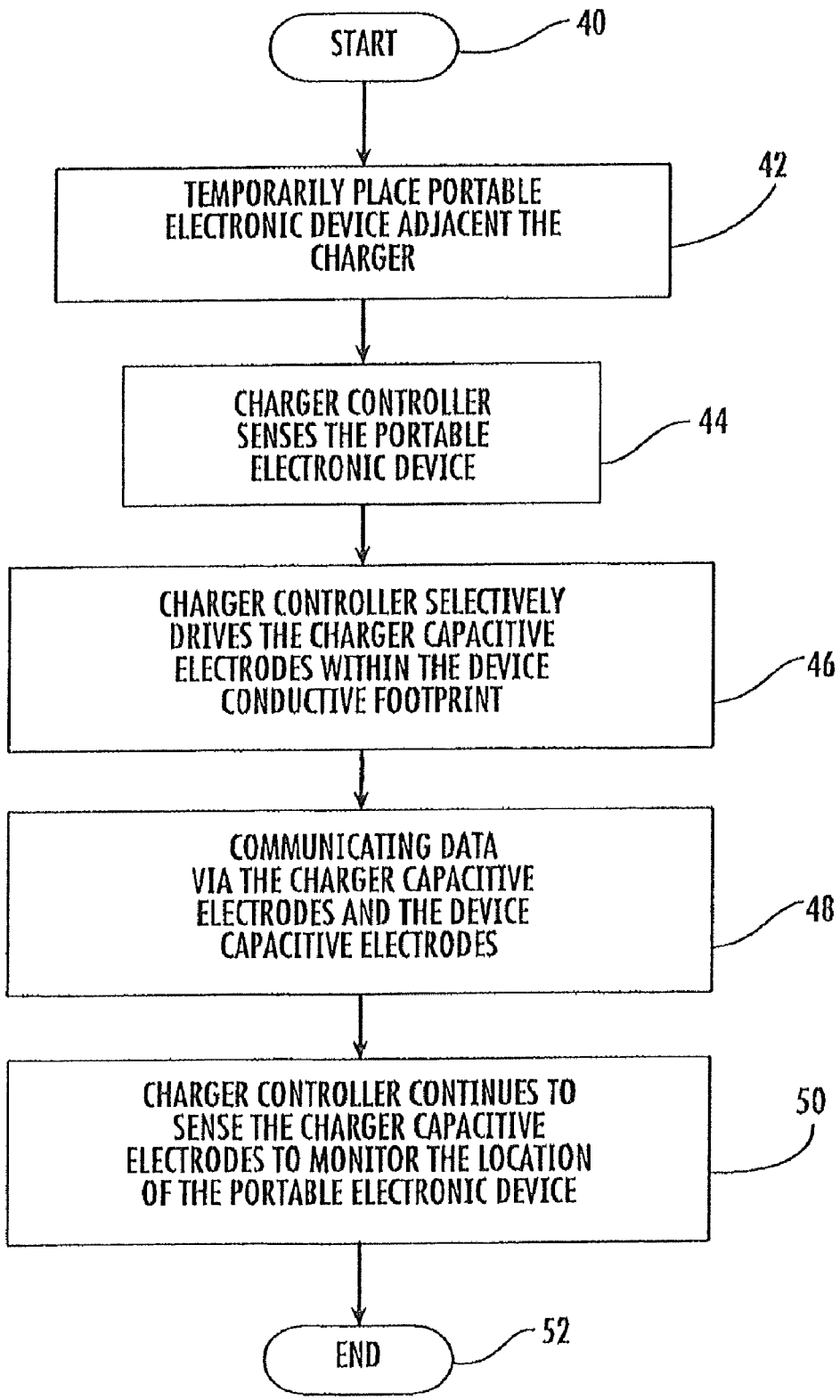
FIG. 4 is a flow chart illustrating a method of capacitively charging a portable electronic device with a charger.

Referring now additionally to the flowchart shown in FIG. 4, a method aspect of the invention is now described. The method is for communicating with and capacitively charging the portable electronic device 12 with the charger 14. As discussed in detail above, the portable electronic device 12 includes a housing 16, a data communication unit 62 and associated battery 18 carried by the housing, and at least one pair of device capacitive electrodes 20 carried by the housing for charging the battery and defining a device conductive footprint 22. The charger 14 includes a base 24 having an area larger than the device conductive footprint 22 and able to receive the portable electronic device 12 thereon in a plurality of different positions, an array of charger capacitive electrodes 26 carried by the base, and a charger controller 28 connected to the charger capacitive electrodes.

The method starts at Block 40 and includes temporarily placing the portable electronic device 12 adjacent the charger 14 at Block 42. The charger controller 28 senses the portable electronic device 12 at Block 44. The charger controller then selectively drives, at Block 46, the charger capacitive electrodes 26 within the device conductive footprint 22 with a charging signal sufficient to capacitively charge the battery 18 of the portable electronic device 12 and not driving charger capacitive electrodes outside the device conductive footprint with the charging signal to thereby capacitively charge the battery of the portable electronic device while reducing undesired EMI. At block 48 data is communicated between the charger data communication unit 70 and the device data communication unit 62 via the charger capacitive electrodes 26 and device capacitive electrodes 20. Such communication may include modulating and encoding data, with the charger data transceiver 72, onto the charging signal, as discussed in detail above. The charger controller 28 continues to sense the charger capacitive electrodes 26 to monitor the location of the portable electronic device at Block 50 before the method ends at Block 52.

Another example of a handheld mobile wireless communications device 1000 that may be used in accordance with the present device and method is further described with reference to FIG. 5. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

Figure 5:
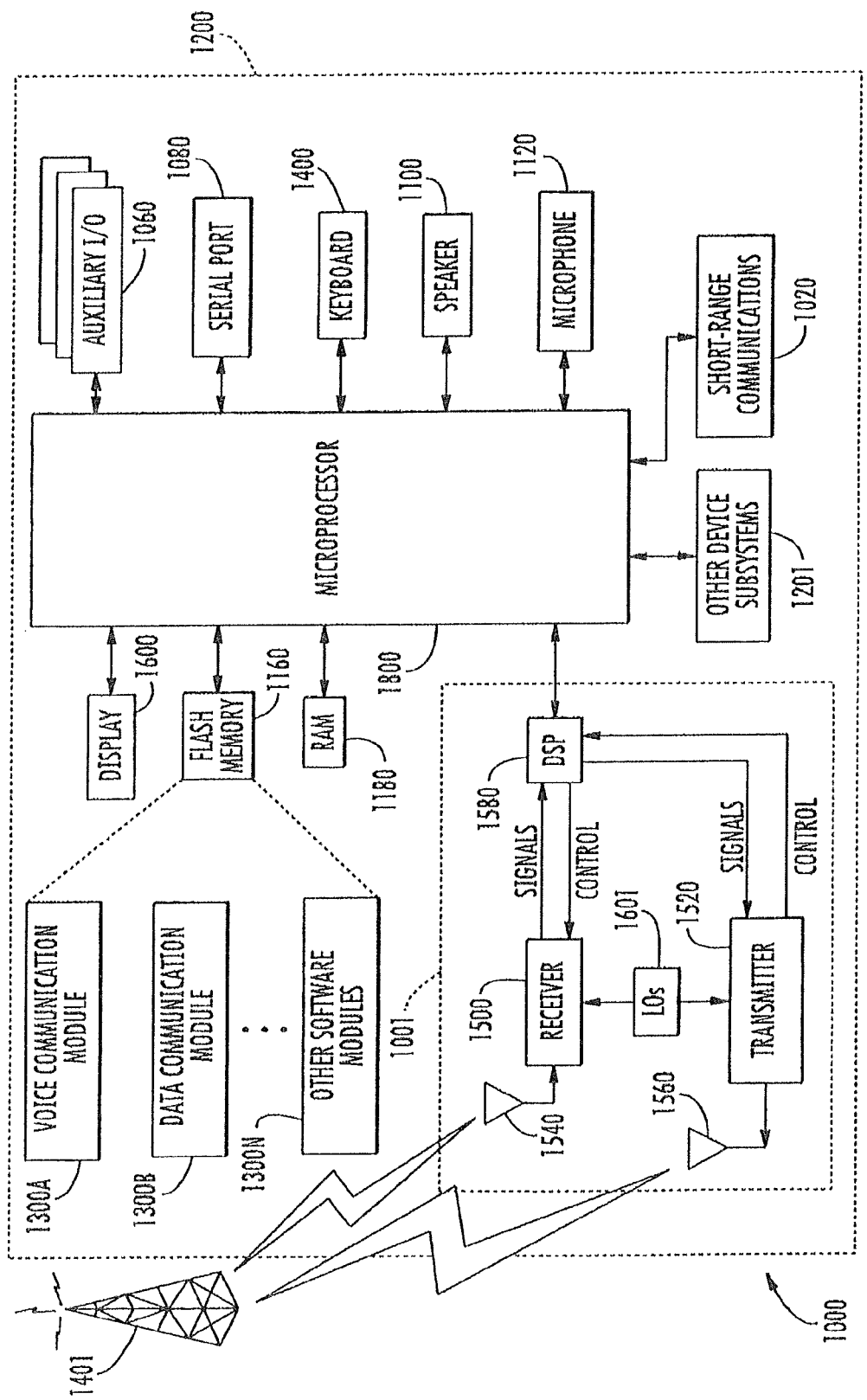
FIG. 5 is a more detailed schematic block diagram of an embodiment of a portable electronic device.

In addition to the processing device 1800, other parts of the mobile device 1000 are shown schematically in FIG. 5. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (CPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. An electronic apparatus comprising:
 a portable electronic device and a charger for capacitively charging said portable electronic device;
 said portable electronic device comprising a housing, a device data communication unit and an associated power pack carried by the housing, and at least one pair of device capacitive electrodes carried by said housing to receive a charging signal to charge said power pack, the at least one pair of device capacitive electrodes defining a device conductive footprint;
 said charger comprising
  a base having an area larger than the device conductive footprint and able to receive said portable electronic device thereon in a plurality of different positions,
  an array of charger capacitive electrodes carried by said base,
  a charger controller for selectively driving said charger capacitive electrodes within the device conductive footprint with a charging signal to capacitively charge said power pack of said portable electronic device when said portable electronic device is positioned on said base of said charger, and
  a charger data communication unit to communicate with said device data communication unit via said charger capacitive electrodes and device capacitive electrodes.

2. The electronic apparatus according to claim 1 wherein said charger controller senses impedances of said charger capacitive electrodes to determine whether a respective charger capacitive electrode is within the device conductive footprint or not.

3. The electronic apparatus according to claim 1 wherein said charger data communication unit modulates data onto the device charging signal to communicate with said device data communication unit via said charger and device capacitive electrodes.

4. The electronic apparatus according to claim 3 wherein said portable electronic device comprises a processor connected to said device data communication unit; and wherein said device data communication unit comprises:
 a device data interface connected to said at least one pair of device capacitive electrodes;
 a device data transceiver connected to said device data interface to demodulate and decode the data communicated on the charging signal; and
 a processor interface connected between said device data transceiver and said processor.

5. The electronic apparatus according to claim 3 wherein said charger data communication unit comprises a charger data transceiver to modulate and encode the data communicated on the charging signal.

6. The electronic apparatus according to claim 5 wherein said charger data transceiver modulates the data onto the charging signal using Frequency Shift Keying (FSK) modulation.

7. The electronic apparatus according to claim 1 wherein said charger comprises a Universal Serial Bus (USB) connector to connect to a personal computer (PC).

8. The electronic apparatus according to claim 1 wherein said charger controller comprises:
 a charging signal generator;
 a switching circuit connected between said charging signal generator and said charger capacitive electrodes; and
 a control circuit connected to said switching circuit.

9. The electronic apparatus according to claim 8 wherein said charger controller further comprises:
 a buffer connected between said charging signal generator and said switching circuit; and
 an impedance detector connected to said buffer and said control circuit.

10. A charger for capacitively charging a portable electronic device when the portable electronic device is placed adjacent the charger, the portable electronic device comprising a housing, a device data communication unit and associated power pack carried by the housing, and at least one pair of device capacitive electrodes carried by the housing to receive a charging signal to charge the power pack, the at least one pair of device capacitive electrodes defining a device conductive footprint, the charger comprising:
 a base having an area larger than the device conductive footprint and able to receive said portable electronic device thereon in a plurality of different positions;
 an array of charger capacitive electrodes carried by said base;
 a charger controller for selectively driving said charger capacitive electrodes within the device conductive footprint with a charging signal to capacitively charge said power pack of said portable electronic device when said portable electronic device is positioned on said base of said charger; and
 a charger data communication unit to communicate with the device data communication unit via said charger capacitive electrodes and device capacitive electrodes.

11. The charger according to claim 10 wherein said charger controller senses impedances of said charger capacitive electrodes to determine whether a respective charger capacitive electrode is within the device conductive footprint or not.

12. The charger according to claim 10 wherein said charger data communication unit comprises a charger data transceiver to modulate and encode data on the charging signal to communicate with the device data communication unit.

13. The charger according to claim 12 wherein said charger data transceiver modulates the data onto the charging signal using Frequency Shift Keying (FSK) modulation.

14. The charger according to claim 10 wherein said charger comprises a Universal Serial Bus (USB) connector to connect to a personal computer (PC).

15. The charger according to claim 10 wherein said charger controller comprises:
 a charging signal generator;
 a switching circuit connected between said charging signal generator and said charger capacitive electrodes; and
 a control circuit connected to said switching circuit.

16. The charger according to claim 15 wherein said charger controller further comprises:
- a buffer connected between said charging signal generator and said switching circuit; and
- an impedance detector connected to said buffer and said control circuit.

17. A method of capacitively charging a portable electronic device with a charger, the portable electronic device comprising a housing, a device data communication unit and associated power pack carried by the housing, and at least one pair of device capacitive electrodes carried by the housing to receive a charging signal to charge the power pack, the at least one pair of device capacitive electrodes defining a device conductive footprint, and the charger comprising a base having an area larger than the device conductive footprint and able to receive the portable electronic device thereon in a plurality of different positions, an array of charger capacitive electrodes carried by the base, a charger controller connected to the charger capacitive electrodes, and an associated charger data communication unit, the method comprising:
- selectively driving, via the charger controller, the charger capacitive electrodes within the device conductive footprint when the portable electronic device is placed adjacent the charger, with a charging signal to capacitively charge the power pack of the portable electronic device to thereby capacitively charge the power pack of the portable electronic device; and
- communicating data between the charger data communication unit and the device data communication unit via the charger capacitive electrodes and device capacitive electrodes.

18. The method according to claim 17 further comprising sensing, via the charger controller, the impedances of the charger capacitive electrodes to determine whether a respective charger capacitive electrode is within the device conductive footprint.

19. The method according to claim 17 wherein the charger data communication unit comprises a charger data transceiver; and wherein communicating comprises modulating and encoding data, with the charger data transceiver, onto the charging signal.

20. The method according to claim 19 wherein the charger data transceiver modulates the data onto the charging signal using Frequency Shift Keying (FSK) modulation.

21. The method according to claim 17 wherein the charger comprises a Universal Serial Bus (USB) connector; and further comprising connecting the charger to a personal computer (PC) via the USB connector.

* * * * *